May 19, 1970 J. H. SHELLEY ET AL 3,512,351

ELECTRICAL OSCILLATION GENERATORS

Filed Sept. 8, 1967 6 Sheets-Sheet 1

May 19, 1970 J. H. SHELLEY ET AL 3,512,351

ELECTRICAL OSCILLATION GENERATORS

Filed Sept. 8, 1967 6 Sheets-Sheet 3

United States Patent Office 3,512,351
Patented May 19, 1970

3,512,351

ELECTRICAL OSCILLATION GENERATORS

John Henry Shelley, Eastcombe, near Stroud, and Thomas Ralph Heeks, Cheltenham, England, assignors to Smiths Industries Limited, London, England, a British company Filed Sept. 8, 1967, Ser. No. 666,244
Claims priority, application Great Britain, Sept. 9, 1966, 40,275/66
Int. Cl. G04c *3/00*
U.S. Cl. 58—23 18 Claims

ABSTRACT OF THE DISCLOSURE

A horological instrument comprising a crystal controlled high frequency oscillator, an intermediate frequency oscillator, and a low frequency electromechanical oscillator. A first frequency controller maintains the frequency of the intermediate oscillator a fixed fraction of that of the high frequency oscillator and a second frequency controller maintains the frequency of the low frequency oscillator a fixed fraction of that of the intermediate frequency oscillator. The frequency of the intermediate frequency oscillator is adjusted during manufacture to give the two fractions.

This invention relates to electrical oscillation generating circuits and to horological instruments incorporating such oscillation generating circuits.

It is known to provide a horological instrument in which a first oscillator producing oscillations at a relatively stable higher frequency is used to control an electromechanical oscillator operating at a lower, and, within limits, adjustable frequency in such a fashion that the period of oscillation of the electromechanical oscillator is a fixed fraction of the period of the first oscillator.

It is also known to provide horological instruments incorporating an electromechanical oscillator such as a balance wheel and hairspring assembly, the balance wheel being arranged to drive time indicating means such as conventional hands, through an indexing mechanism. Such a horological instrument is described in our British patent specification 956,768.

As is well known, any periodic oscillation can be regarded as built up by the addition of a number of sinusoidal oscillations, a fundamental oscillation, at the lowest frequency, and harmonics at integral multiples of the fundamental frequency. When, hereinafter, reference is made to the phase of an oscillation, the phase of the fundamental component is intended.

Thus, if we have two oscillations, with fundamentals $A \sin (pt+a)$ and $B \sin (qt+b)$, ($p$, $q$, A, $a$, B, $b$ all being constants), the phase difference between the oscillations will be $(p-q)t+(a-b)$, i.e. it will increase linearly with time, the rate of increase being proportional to the difference of the frequencies.

It will be appreciated that where hereinafter reference is made to determination of relative phases between the oscillators at a particular time, changes of relative phase by integral multiples of $2\pi$ radians arising prior to that time are ignored.

According to one aspect of this invention there is provided a horological instrument comprising a crystal controlled high frequency oscillator, at least one intermediate frequency oscillator and a low frequency mechanical oscillator, the frequencies of the intermediate frequency oscillator or oscillators and of the low frequency oscillator being adjustable within limits and stable in the short term, a number of frequency controllers equal to the number of intermediate frequency oscillators plus one, each frequency controller being arranged to maintain the frequency of an individual one of the oscillators other than the high frequency oscillator at a fixed fraction of the frequency of the oscillator having the adjacent and higher frequency, each frequency controller comprising means to generate successive signals at predetermined successive times in accordance with the relative phase of the oscillations of the two oscillators at those times, the said signals acting to adjust the lower frequency in the sense to maintain the said relative phase constant, and time indicating means which are arranged to be driven by the mechanical oscillator through an indexing mechanism.

The successive times conveniently occur at integral multiples of the period of the lower frequency for example when every $n^{th}$ oscillation ($n$ being an integer which may be unity) passes through some predetermined point in its cycle. It will thus be seen that each frequency controller operates inherently by maintaining, in the long term, a substantially fixed phase relationship between the oscillations of the two oscillators to which it is connected. This, of itself, is not sufficient to ensure that there is a fixed relationship between the frequencies of the two oscillations; but the required frequency relationship will be achieved if any change in the frequency of the oscillations in the interval between the generation of one of the successive signals and the next subsequent successive signal is such that the relative phase change of that interval is sufficiently small compared with $2\pi$. For example, if for definiteness we suppose the relative phase signal is determined once, at a datum point, for each cycle of the lower frequency, and the desired ratio between the frequencies of the two oscillations is $r:1$ ($r$ conveniently an integer), the relative phase change will be $(r \text{ (actual)} - r) \cdot 2\pi$ where $r$ (actual) is the actual ratio of the frequencies, which will in general not be quite identical with $r$, but as long as $r$ (actual) is sufficiently close to $r$ to make $r$—$r$ (actual) a small fraction, i.e. substantially less than unity, the required ratio of the frequencies will, in the long term, be achieved.

Thus, as long as the lower frequency is sufficiently stable over the period between successive relative phase determinations to ensure that any changes of relative phase caused by instability or drift of the frequency of the lower oscillator are small compared to $2\pi$, the required relationship between the frequencies of the two oscillations in the long term will be achieved. As a practical matter achievement of this degree of stability for the oscillator having the lower frequency presents no difficulty. For example considering the intermediate frequency oscillator or the intermediate oscillator having the highest frequency, if the frequency of the high frequency oscillator is 1 mc./s. and $r$ is 400 so that the frequency of the intermediate frequency oscillator is 2,500 c./s. and the relative phase determination is made once for each cycle of the intermediate frequency oscillator, the random frequency drift of the intermediate frequency oscillator has to be substantially less than 1 part in 400 per cycle; and this is very readily achieved.

According to a feature of this aspect of this invention there is provided a method of manufacturing a horological instrument as hereinbefore defined which includes the step of measuring the frequency of the crystal controlled high frequency oscillator and the step of adjusting the value of a component of each intermediate frequency oscillator so that the higher frequency of each pair of adjacent frequencies divided by the lower frequency is an integer.

It is possible to purchase relatively cheaply crystals to be incorporated into a relatively high frequency oscillator which will oscillate within a defined band, for example, between 995 kc./s. and 1005 kc./s. It is however expensive to purchase a crystal which when incorporated into an oscillator will oscillate at a particular defined frequency for example 999,040 c./s. This method enables relatively cheap crystals to be used as will be illustrated by the following example. A horological instrument as hereinbefore defined may be built with a high frequency crystal controlled oscillator, one intermediate frequency oscillator and with the low frequency mechanical oscillator designed to oscillate at 5 cycles per second. The frequency of the high frequency oscillator is then measured and divided by 5 and the division ratio between the high and intermediate frequency and the intermediate and lower frequencies are arranged to be integers such that when they are multiplied together they are equal to the frequency of the high frequency oscillator divided by 5. For example, if the frequency of the high frequency oscillator is 1,001,250 then the two division ratios are arranged to be such that when multiplied together, they are equal to 1,001,250 divided by 5 i.e. equal to 200,250. In this particular case the two integers could be 450 and 445. In another example, if the high frequency oscillator is found to oscillate at 1,001,280, the two division ratios are arranged to be integers which when multiplied together give the number 1,001,280 divided by 5 i.e. 200,256. In this particular case the two integers would be 447 and 448. It is possible to alter slightly the frequency of oscillation of a crystal controlled high frequency oscillator and it should be possible for most crystals bought having a nominal frequency of 1 mc./s. to alter the frequency such that when the frequency is divided by 5 the number then given is equal to a number which can be obtained by multiplying together two very approximately equal integers.

It will be appreciated that the stability of oscillation of the low frequency mechanical oscillator will be equal to that of the crystal control high frequency oscillator. If for example the long term drift of the high frequency crystal controlled oscillator is one part in a million and the frequency of the mechanical oscillator is 5 c./s. the long term stability of the horological instrument will still be equal to one part in a million. A drift of one part in a million is equal to an alteration of under a minute in a year and it will be appreciated that this gives an overall time keeping of a very high accuracy.

It will be appreciated that if the mechanical oscillator is an electromechanical oscillator, the frequency of the electrical oscillations of which differ from that of its mechanical oscillations, e.g. it is twice that of the mechanical oscillations, then the two integers referred to must, when multiplied together, be equal to the frequency of the high frequency oscillator divided by that of the electrical oscillations of the electromechanical oscillator.

According to another aspect of this invention there is provided a circuit for generating electrical oscillations comprising a first oscillator adapted to produce oscillations at a first, higher frequency, a second oscillator adapted to produce oscillations at a second, lower frequency, means to derive a pulse of defined width less than that of the period of the first oscillator from each or selected oscillations of the second oscillator, and AND gate means having first and second inputs, the first oscillations and the pulses being fed to the first and second inputs respectively so that the output of the AND gate means is a function of the relative phase of the first and second oscillations, the output of the gate means acting to alter the frequency of the said second oscillator in the sense to maintain said relative phase constant.

It will be appreciated that this circuit may be used on a number of occasions to provide successive stages of frequency reduction. For example a first application of this circuit could be used to effect a reduction of frequency from 1 mc./s. to 2,500 c./s. and a second application of this circuit could be used to effect a further reduction in frequency. Then it will also be appreciated that this circuit can be incorporated as part of a horological instrument, for example, that specified as the first aspect of this invention. In particular this circuit is suitable for the first stage of a horological instrument as defined previously.

According to yet another aspect of this invention there is provided a circuit for producing electrical oscillations comprising a first oscillator adapted to produce oscillations at a first, higher, frequency, a second oscillator adapted to produce oscillations at a second, lower, frequency, pulse generating means for generating a pulse in each cycle of the oscillations at the second frequency, and a bistable to which the said pulses and the oscillations at the first frequency are fed, the said pulses being arranged to trigger the bistable from its quiescent state to which it is caused to revert at a defined point in the next cycle of the oscillations at the first frequency so that the output signal of the bistable is a pulse whose width is dependent on the relative phase of the two oscillations; the output signals of the bistable acting to alter the second frequency in the sense to maintain said relative phase constant.

According to a further aspect of this invention there is provided a horological instrument comprising an oscillator for producing first oscillations at a first, higher, frequency, an electromechanical oscillator comprising a spring restrained balance arranged to perform rotational oscillations at a second lower frequency, a magnet assembly, a coil assembly, one of the said assemblies being carried by the balance and the other being fixed so that two E.M.F.'s of opposite polarity are induced in the coil assembly during each swing in each direction of the balance, and an electronic circuit to which the said induced E.M.F.'s are fed, the electronic circuit being arranged, in response to each of the said E.M.F.'s to apply to the coil assembly a current pulse which interacts with the magnetic flux produced by the magnetic assembly to produce an impulse on the balance in the sense to maintain its oscillations, there being provided means for generating signals in accordance with the relative phase of the first oscillations and the said induced E.M.F.'s, the said signals being applied to the electronic circuit and acting to alter the relative magnitudes of the current pulses fed to the coil assembly in response to the induced E.M.F.'s of opposite polarity in the sense to maintain the said relative phase constant.

It will be appreciated that this latter aspect of the invention provides a method of maintaining an integral relationship between the frequency of oscillation of an electromechanical oscillator and the frequency of a relatively high frequency oscillator. It will also be appreciated that a horological instrument constructed in accordance with the latter aspect of this invention may also be constructed in accordance with the first mentioned aspect of this invention and in this case it will of course be understood that the oscillator referred to in the previous paragraph is one of the intermediate oscillators of the first mentioned aspect of this invention.

A horological instrument in accordance with this invention will now be described, by way of example, only, with reference to the accompanying drawings of which:

Figures 1, 2:
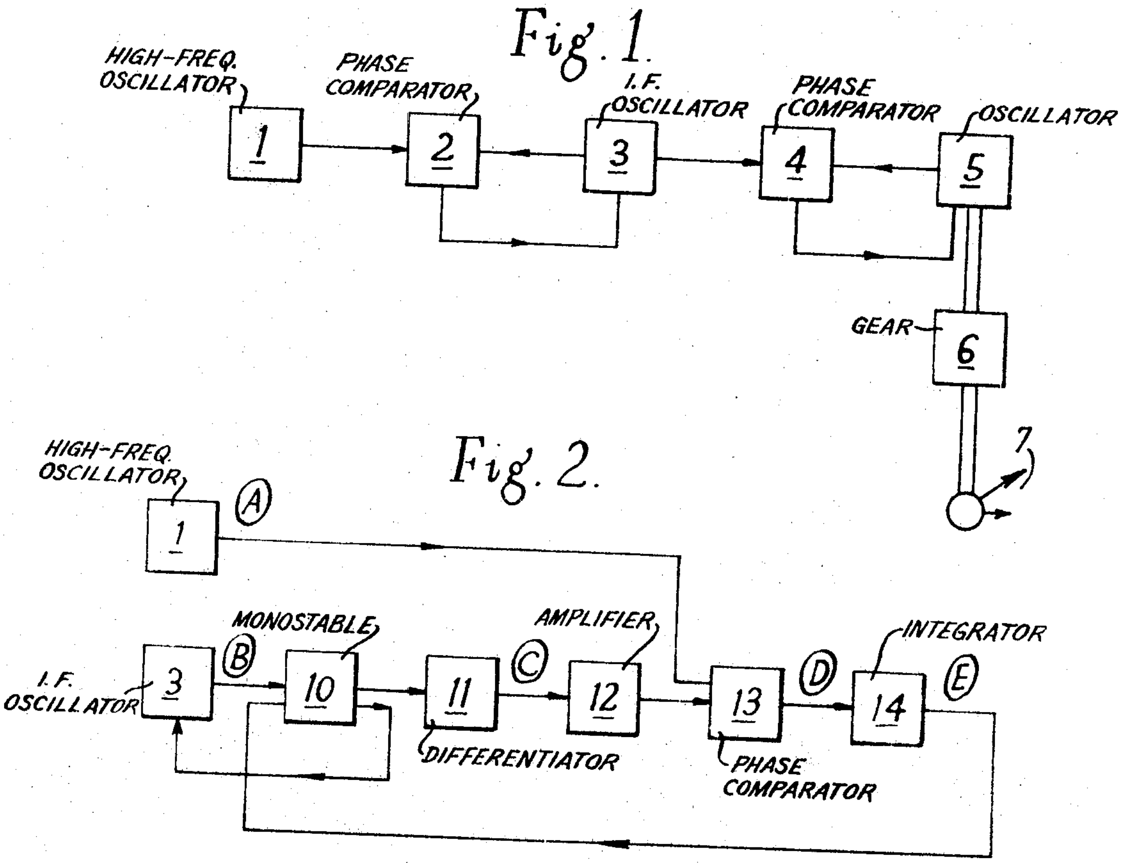
FIG. 1 is a simplified block diagram of the whole horological instrument which is a clock.
FIGS. 2 and 3 are respectively a more detailed block diagram and a circuit diagram of a part of the clock.

Referring first to FIG. 1 a high frequency oscillator 1 is crystal controlled and has a good long term stability. An intermediate frequency oscillator 3 produces an electric oscillation, the fundamental component of which has a considerably lower frequency than that of oscillator 1. The frequency of the oscillator 3 may be varied over a limited range by the application to it of the output of a phase comparator 2. The oscillations from the oscillators 1 and 3 are applied to the phase comparator 2 which, at a defined instant in each cycle from the oscillator 3, generates an output signal in accordance with the relative phase of the oscillations of oscillators 1 and 3 at that instant. This output signal is applied to the oscillator 3 in such a fashion as to control the frequency of the oscillator 3 to maintain a fixed phase relationship between the oscillations of the oscillator 3 and hence, as discussed above, a fixed frequency relationship between the high frequency oscillator 1 and the intermediate frequency oscillator 3.

An electrically maintained balance 5 oscillates at a frequency very much lower than that of the oscillator 3 and drives a conventional pair of hands 7 through an indexing mechanism and a gear transmission 6. The circuit associated with the balance produces an electric oscillation at double the frequency of the rotary oscillations of the balance, and the balance is to be considered an oscillator by which term it is denoted in the description of FIGS. 1 and 5. The oscillations from the oscillators 3 and 5 are applied to a further phase comparator 4 which, at an instant in each cycle of the oscillator 5, generates an output signal in accordance with the relative phase of the output of the oscillators 3 and 5 of that instant. This output signal is applied to the oscillator 5 in such a fashion as to control its frequency so as to maintain a fixed phase relationship between the oscillators 3 and 5 and hence, as discussed above, a fixed frequency relationship between the oscillators 3 and 5 and thus a fixed frequency relationship between the oscillators 1 and 5.

The frequency of the rotary oscillations of the electrically maintained balance is 5 c./s. (the frequency of the electric oscillations of oscillator 5 is then 10 c./s.) and that of the crystal controlled oscillator 1 is nominally 1 mc./s. depending on the characteristics of the particular crystal. In production the apparatus is assembled and the frequency of the oscillator 1 is then measured. The frequency of the oscillator 3 is then chosen to be such that the frequency of the oscillator 1 divided by that of the oscillator 3 is an integer and that of the oscillator 3 divided by the frequency of the oscillator 5 is also an integer. For example should the frequency of the oscillator 1 be exactly 1 mc./s. then the frequency of the oscillator 3 is arranged to be 2.5 kc./s. so that the step down ratios are 400 and 250 respectively. Various other examples have been given previously and should the natural frequency of oscillations of the oscillators 1 be such that division by two numbers both of which are integers is impossible then the frequency of the oscillator 1 may be altered slightly by altering the value of one of its components other than the crystal.

It will be appreciated that as a matter of principle the intervals for each pair of oscillators at which the relative phases are determined are unimportant, provided only that they are sufficiently small to ensure that any drift of the period of the lower frequency oscillator over any such interval is very small compared with the period of the oscillations of the higher frequency oscillator. Nevertheless it is convenient to have the intervals determined by the lower frequency oscillator, for example, a determination of phase being made for every $n$ oscillations of a lower frequency oscillator, $n$ being an integer (which is unity for both frequency divisions of the arrangement which has already been described). The signal which is derived by each of the phase comparators and which represents the phase relationship is compared with a datum which may or may not be zero for either or both of the phase comparators.

Furthermore the datum for the relative phase signals need not be, although it preferably is, fixed. For example, it could be made dependent on the number of cycles of the lower frequency oscillator which have elapsed since the last phase comparison. This entails great complexity, and is in fact not so satisfactory as regards overall accuracy, though it does permit the theoretical possibility of a non-integral relationship between the frequencies of the higher and lower frequency oscillators.

Figure 7:
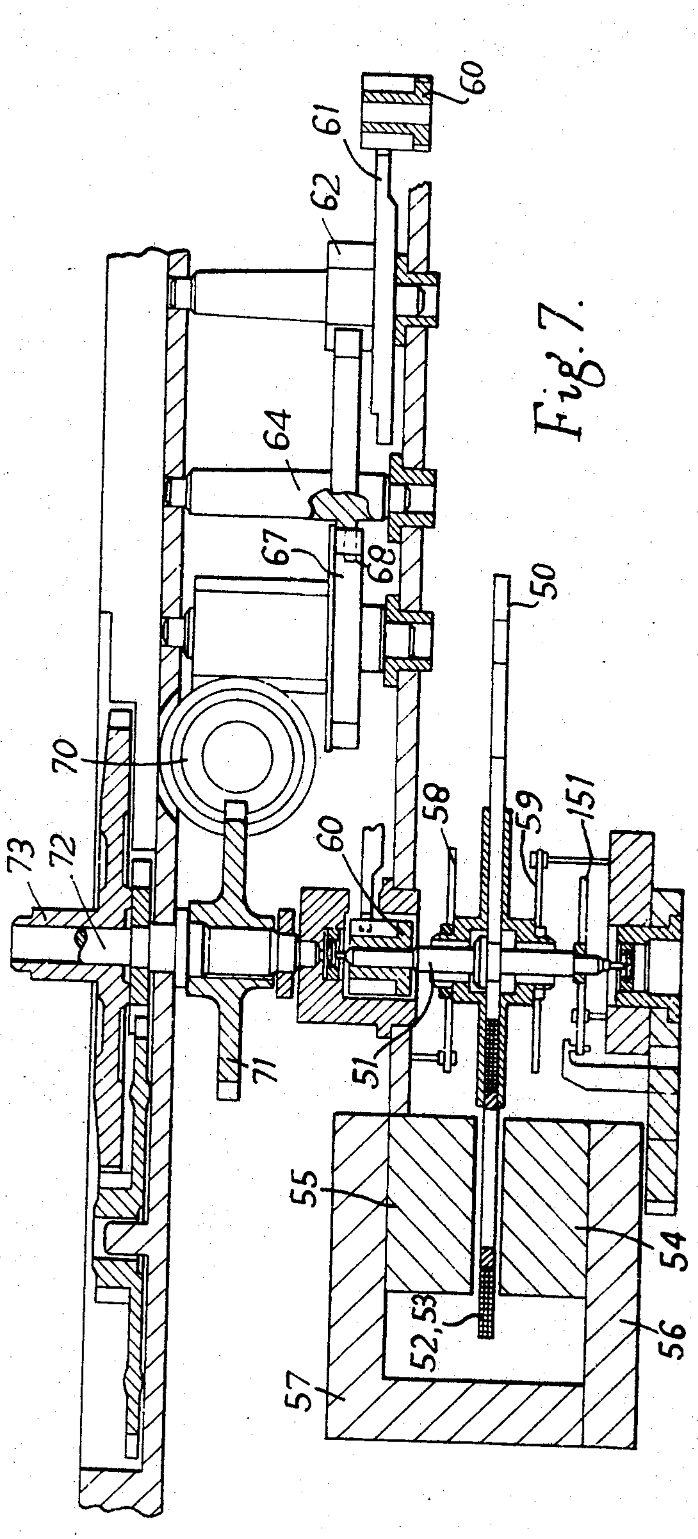
FIG. 7 shows an electrically maintained balance indicated by the numeral 5 in FIGS. 1, 5 and 6, an indexing mechanism and a gear transmission driven by the electrically maintained balance; and, FIG. 8 is a plan view of the balance shown in FIG. 7.
Figure 8:
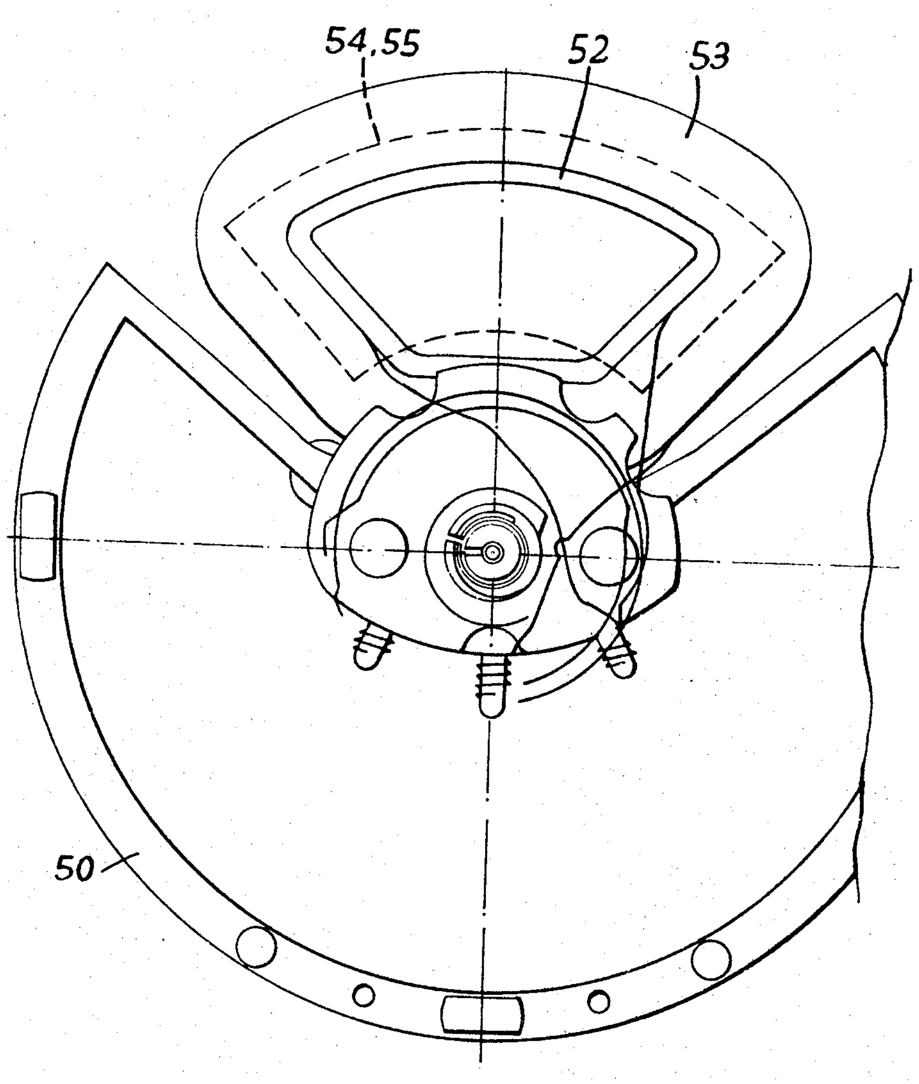

It is convenient to first describe the electrically maintained balance which is illustrated in FIGS. 7 and 8 together with other parts of the clock.

A balance 50 is mounted on a spindle 51 for rotary oscillations about the axis of the spindle 51. The balance 50 carries two flat coils 52 and 53 in its plane, the coil 52 lying within the coil 53, and oscillates through the gap between two magnets 54 and 55 which are provided with flux return members 56 and 57. It is to be noted that the whole magnet assembly is rigidly fixed to the clock. One end of each of the coils 52 and 53 is connected to the external circuit through the spindle 51 and a hairspring 151. The other ends of the two coils are connected to the external circuit through hairsprings 58 and 59 respectively which together with the hairspring 151 regulate the motion of the balance 50 in conventional manner. As the balance oscillates, E.M.F.'s are induced in the coils 52 and 53 as they pass through the flux in the gap between the magnets and each E.M.F. induced in the coil 52 which acts as the trigger coil is passed to the external circuit which causes a current pulse to pass through the other coil 53 which acts as the drive coil. This current pulse interacts with the flux in the gap and produces an impulse on the balance 50 in the sense to maintain its oscillations.

The spindle 51 carries a pinion 60 which engages a spur gear 61 which is part of a cluster of two gears the other of which is denoted by the numeral 62. It is to be noted that the section of FIG. 7 passes through all the centers of the pinions in conventional horological manner and for this reason the pinion 60 is shown twice to illustrate the manner of drive. The gear 62 engages a gear sector carried by a spindle 64 which operates the indexing mechanism which consists of an index wheel 67 and a pin 68. Details of this indexing mechanism will not be described as it forms no part of this invention.

The indexing mechanism drives through a transmission including a worm 70 and a wormwheel 71, a spindle 72 which is rotatable about the axis of the spindle 51, which carries the hour hand, and which drives, through a conventional Cannon mechanism, the sleeve 73 carrying the second hand. FIG. 8 shows a plan view of the balance, of the coils and of the magnets and from which their shape can be noted.

Figure 4:
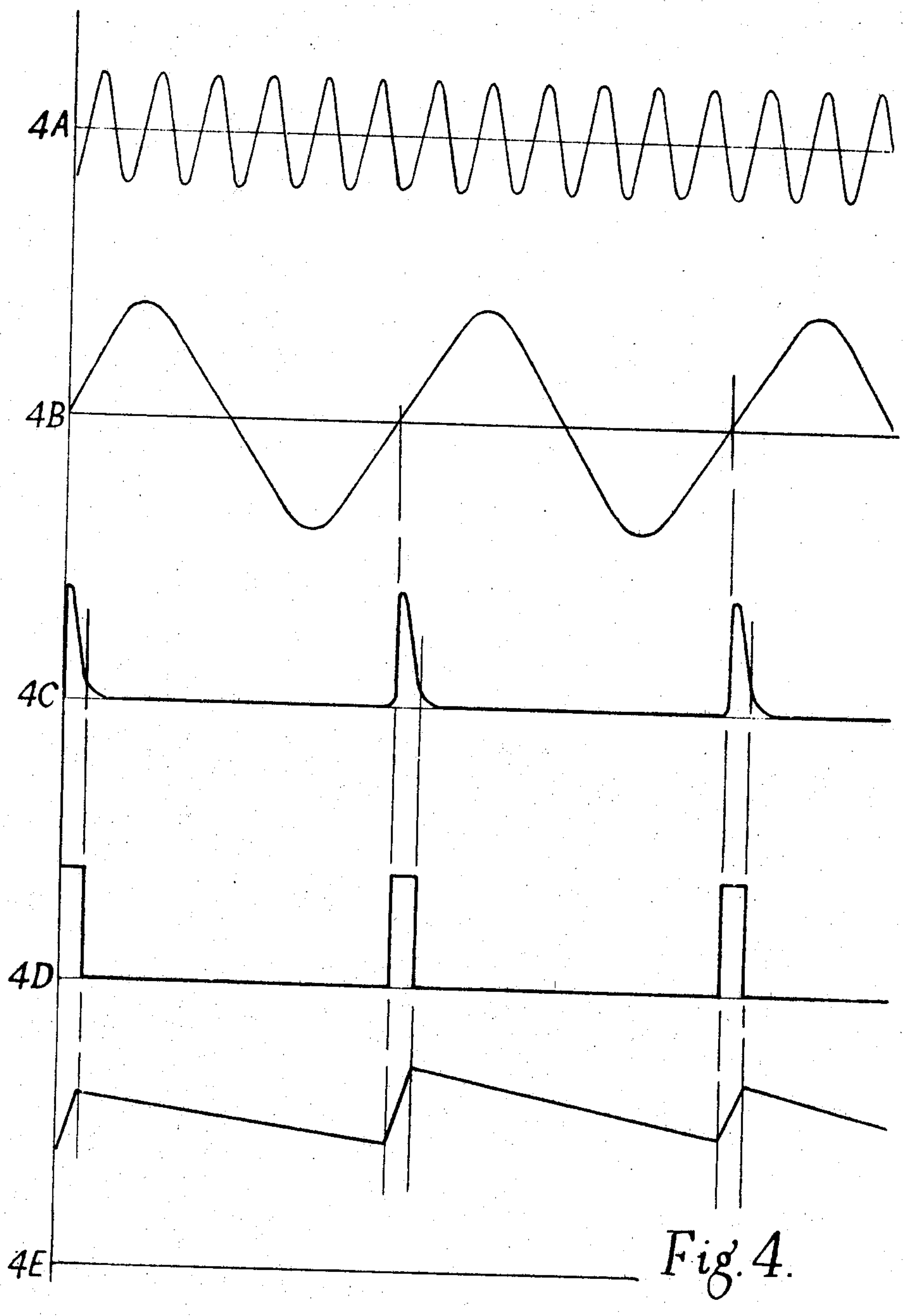
FIG. 4 shows various waveform diagrams relating to the block and circuit diagrams shown in FIGS. 2 and 3.

Referring now to FIG. 2 and to the associated waveforms illustrated in FIG. 4, the intermediate frequency oscillator 3 produces an output which is shown in FIG. 4B and which is fed to a monostable 10. The monostable 10 produces for each cycle of the intermediate frequency oscillator 3, at a defined instant which will be discussed later, an output pulse of fixed width which is differentiated by a differentiating circuit 11 to give a positive going pulse illustrated in FIG. 4C. This positive going pulse is amplified by an amplifier 12 and passed to a phase comparator 13. The output of the high frequency oscillator 1 is illustrated in FIG. 4A and is also passed to the phase comparator 13 which produces an output pulse illustrated in FIG. 4D, the width of which is dependent on the phase difference between the signals from the two oscillators 1 and 3 namely the phase difference between the signals illustrated in FIGS. 4A and 4B. This output pulse is passed to an integrator 14 having a long time constant in comparison with the frequency of the intermediate frequency oscillator 3 and has an output signal having the waveform illustrated in FIG. 4E. This output waveform is, it will be seen, in the nature of a varying direct signal. The output signal of the integrator 14 is fed to the monostable 10. The monostable 10 is triggered when the magnitude of the signal shown in FIG. 4B from the oscillator 3 exceeds the signal (FIG. 4E) passed by the integrator 14 so that the phase of the pulses produced by the monostable 10 varies in accordance with the relative phase of the oscillators 1 and 3 through the width of these pulses and their magnitude does not vary. The output pulses of the monostable 10 are also fed to the oscillator 3 and are used to vary the frequency of that oscillator. It is well known that an energy input into an oscillating system produces an alteration of the frequency if that energy input occurs at an instant other than its datum or, in the case of an electrical system, other than the point where the output waveform is passing through zero. In the arrangement shown each output pulse of the monostable 10 is fed to the oscillator 3 and alters its period in accordance with its phase. Thus as the output signal of the phase comparator 13 and the integrator 14 causes the phase of the pulses of the monostable 10 to vary, the output signal of the integrator 14 thereby causes the period of the intermediate frequency oscillator to vary. It is of course arranged that this variation is caused to take place in the sense to maintain the intermediate oscillator 3 at a defined and required phase relationship in comparison to the high frequency oscillator 1 and thus, as explained, maintains the frequency ratio between the oscillators 1 and 3 at the desired value. It is of course to be noted that the alteration in the phase of the pulses from the monostable 10 alters the phase of the pulses from the differentiating circuit 11 (FIG. 4C) and therefore alters the output of the comparator 13. However, the overall effect of this phase variation is zero as a result of the integrating circuit 14 being provided.

Figure 3:
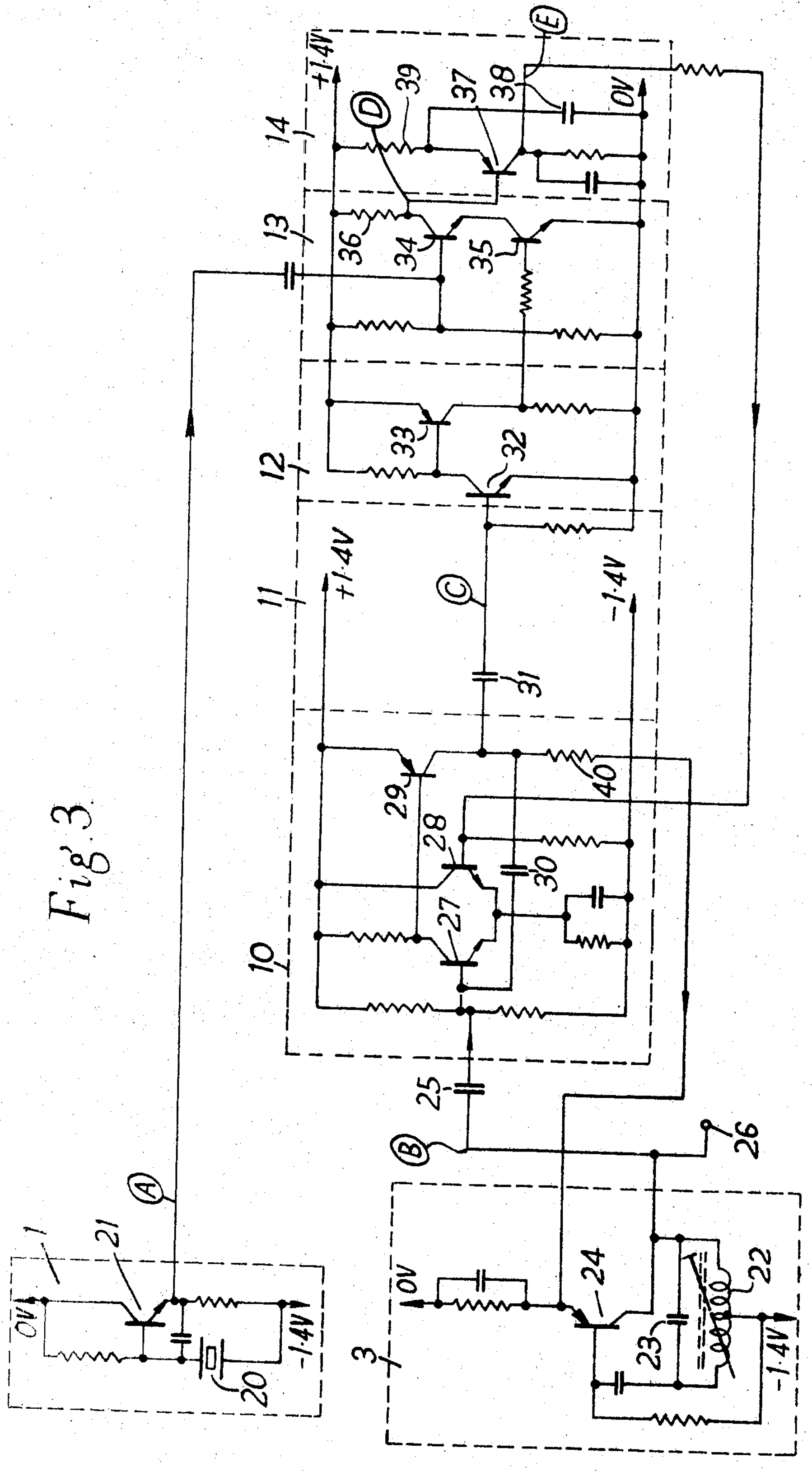

Referring now to FIG. 3 which shows the circuit diagram of the arrangement illustrated in FIG. 2, the oscillator 1 has a crystal 20 which fixes its frequency and a single transistor 21 and is of conventional construction. The oscillator 3 is a conventional LC Colpitts oscillator, the frequency of which is predominantly controlled by an iron cored inductor 22 and a capacitor 23 of fixed value. The iron core of the inductor 22 is mechanically adjustable to preset the frequency of oscillation in known manner and for the purpose already explained. The output of this oscillator appears at the collector of its transistor 24 and is passed through a capacitor 25 to the monostable 10. The output is also passed, as illustrated by the terminal 26, for use in controlling the low frequency oscillator 5.

The monostable 10 has three transistors 27, 28 and 29 of which the transistors 27 and 28 are of the n-p-n type and are coupled together to form a long tailed pair. In the quiescent condition, transistor 28 conducts and transistors 27 and 29 are cut off and the circuit remains in this condition until the voltage on the base of transistor 27 rises above a predetermined level which is set by the voltage on the base of transistor 28. When the voltage on the base of transistor 27 does rise above this level, current is diverted from transistor 28 to transistor 27 and the circuit switches to the state in which the transistors 27 and 29 conduct and transistor 28 is cut off, positive feedback being provided by the capacitor 30 which is connected between the collector of transistor 29 and the base of transistor 27. The circuit reverts to its quiescent state after a fixed time interval determined by the values of the components of the circuit. The output of the monostable 10 is taken from the collector of transistor 29 and is differentiated by a capacitor 31 in the differentiating circuit 11 and is passed to the amplifier 12 which is of conventional configuration and has two transistors 32 and 33.

The phase comparator 13 consists of two transistors 34 and 35 connected in series so that current only flows through their load resistor 36 when both transistors are caused to conduct by positive going waveforms. The output of the amplifier 12 is fed to the base of transistor 35 whereas the output (FIG. 4A) of the oscillator 1 is fed to the base of transistor 34. The output of the phase comparator 12 is in the form of a narrow pulse illustrated in FIG. 4D the width of which depends on the relative phase of the signals from the circuit 11 (FIG. 4C) and the oscillator 1 (FIG. 4A) as will be appreciated. The output of the phase comparator 13 is fed to the integrator 14 which has a transistor 37 and a capacitor 38 and which is arranged to have a long time constant in comparison to the period of the oscillator 3. The output signal of the integrator 14 is fed to the base of the transistor 28 of the monostable 10 so that as the magnitude of the output signal of the comparator 14 (illustrated in FIG. 4E) increases the potential required to trigger the monostable 10 increases so that the phase of the output pulses of the monostable 10 alters.

The output pulses of the monostable 10 are also fed through the resistor 40 to the collector of the transistor 24 and are used, as has been previously explained, to alter the period of the oscillator 3 so that the period is dependent on the phase of those pulses.

Figure 5:
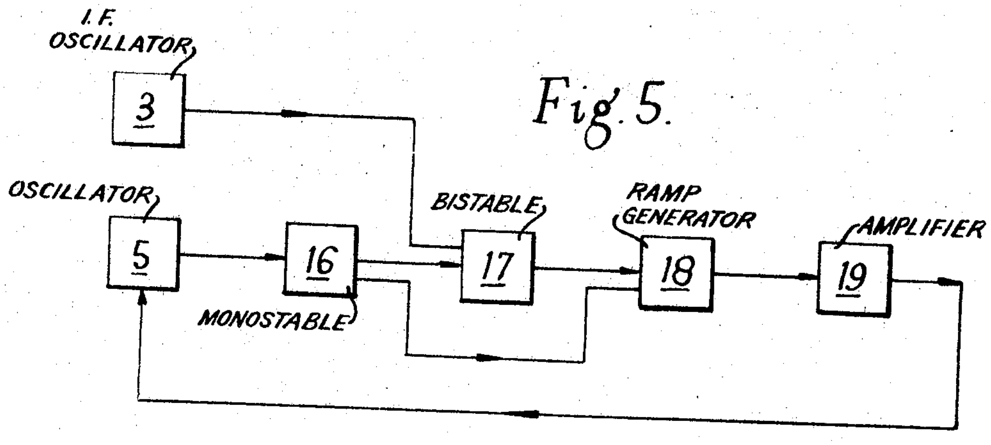
FIGS. 5 and 6 show respectively a more detailed block diagram and a circuit diagram of another part of the clock.
Figure 6:
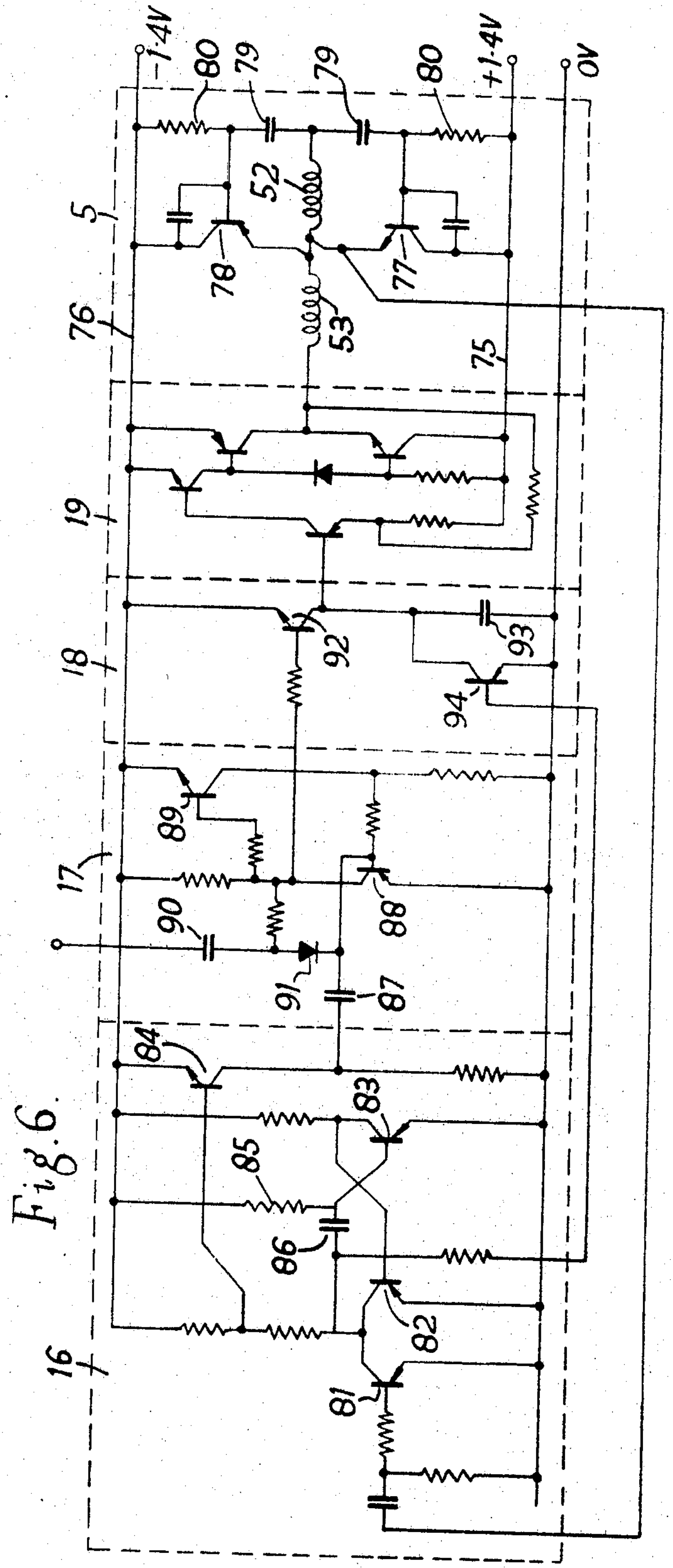

Referring now to FIGS. 5 and 6 the output of the oscillator 5 is fed to a monostable 16 which produces for each cycle of the oscillator 5 an output in the form of a pulse which has a width rather less than that of the period of the oscillator 5 and thus less than half the period of the rotary oscillator of the balance 50. The output from the monostable 16 and that of the intermediate frequency oscillator 3 are fed to a bistable 17 which acts as the phase comparator, the bistable 17 being triggered from its quiescent state by each pulse from the monostable 16 and back to its quiescent state by the next cycle from the oscillator 3 at a particular point in that cycle so that the width of the output pulse of the bistable 17 is directly proportional to the relative phase of the oscillators 3 and 5. The output of the bistable 17 which is in the form of a pulse the width of which depends on the relative phase is fed to a ramp generator 18 which generates a signal the magnitude of which is directly proportional to the width of the output pulse of the bistable 17. The output of the ramp generator 18 is fed through an amplifier 19 to the oscillator 5 which incorporates, as previously noted, an electrically maintained balance and is used to regulate the size of the next two drive pulses occurring in the drive coil 53 so as to bring the oscillator 5 to the required frequency.

The monostable 16 also applies a signal directly to the ramp generator 18 during the quiescent state of the monostable 16 and after the drive pulse referred to in the previous paragraph has been regulated, and this signal brings the output signal of the ramp generator 18 back to zero prior to the next comparison of the phases carried out by the phase comparator 17.

In detail, referring now to FIG. 6, the junction of the coils 52 and 53 is connected to positive and negative supply lines 75 and 76 through complementary transistors 77 and 78 respectively. The remote end of the trigger coil 52 is connected to the negative supply line and to the positive supply line through similar circuits circuits consisting of a capacitor 79 and a resistor 80 in series. The junction of each capacitor 79 and the resistor 80 is connected to the base of the associated transistor. During each swing of the balance, as the coils 52 and 53 pass through the magnetic flux produced by the magnets 54 and 55, a positive E.M.F. and a negative E.M.F.

is induced in the trigger coil. When a positive E.M.F. is induced in the trigger coil 52 (by "positive" it is meant that the end of the coil 52 connected to the capacitors 79 becomes positive with respect to the end connected to the coil 53), the transistor 77 is caused to conduct and a current pulse passes through the drive coil 53 from right to left. Similarly when a negative E.M.F. is induced in the trigger coil 52 the transistor 78 is caused to conduct and a current pulse passes through the drive coil 53 from left to right. Each of these current pulses through the drive coil 53 interacts with the flux in the gap between the magnets 54 and 55 to produce an impulse on the balance 50 in the sense to maintain its oscillations. One of these impulses occurs before the datum position of the balance and one after the datum position of the balance. The circuit shown regulates the period of oscillation of the balance by changing the relative magnitudes of the two impulses but not the overall magnitude of the two impulses thus ensuring that the amplitude of oscillation remains constant.

The monostable 16 is operated by the first E.M.F. induced in the trigger coil 52 during each swing of the balance 50, a signal being taken from the junction of the coils 52 and 53. The monostable 16 has four transistors 81, 82, 83 and 84. The period of the monstable 16 is controlled by the time constant of a resistor 85 and a capacitor 86. The transistor 84 only acts as an inverter and does not form part of the monostable as such. The output of the monostable 16 is passed by a capacitor 87 to the bistable 17 which has a pair of complementary transistors 88 and 89. The bistable 17 is triggered from its quiescent state by the negative going pulse produced by the capacitor 87, this negative going pulse occurring at the beginning of the output pulse of the monstable 16. The output of the oscillator 3 is fed to the bistable through a capacitor 90 and a diode 91 so poled as to only allow positive going signals to enter the bistable 17 from the oscillator 3. After the bistable 17 has been triggered from its quiescent state the next positive going signal triggers the bistable 17 back to its quiescent state so that the width of the output pulse of the bistable 17 is directly proportional to the relative phase of the oscillators 3 and 5. This output signal is fed to the ramp generator 18 which comprises a transistor 92 and a capacitor 93 which is arranged to charge up linearly during the output signal of the bistable 17 so that the magnitude of the signal across the capacitor 93 is directly proportional to the relative phase. As previously explained a signal from the ramp generator is fed to the amplifier 19 which is a push-pull amplifier and controls the potential of the end of the drive coil 53 remote from the trigger coil 52, the amplifier 19 being connected to this end of the coil 53.

The above noted operation occurs quickly immediately after the receipt of the signal from the trigger coil 52 and is completed prior to the corresponding current pulse being passed through the drive coil 53 and the potential across the capacitor 93 remains constant until the monostable 16 reverts to its quiescent state when the capacitor 93 is short circuited by a transistor 94 connected across it and connected to the monostable 16. This only occurs well after the second current pulse of that particular swing of the balance 50 is driven through the coil 53 so that the potential at the end of the drive coil 53 remote from the coil 52 is at the same value during the two current pulses driven through the drive coil 53 during a particular swing of the balance 50. The effect of the amplifier 19 increasing or decreasing the potential of the end of the coil 53 distant from the coil 52 is to change the relative magnitude of the two pulses passing through the drive coil 53. For example it will be appreciated if that end of the coil 53 is made more negative by the amplifier 19 the effect will be to increase the size of the current pulse which passes through the drive coil 53 in response to a positive pulse being induced in the trigger coil 52 and to reduce the magnitude of the current pulse which passes through the drive coil 53 in response to a negative E.M.F. being induced in the trigger coil 52. The amplifier 19 is arranged to alter the potential of the end of the coil 53 in the sense to bring the relative phase of the two oscillators 3 and 5 to a desired value and thus, as already explained, to maintain the frequency ratio between the frequencies of the oscillators 3 and 5 at a desired value.

In the emobdiment described the relative phase of the oscillations for each pair of oscillators is determined for every cycle of the lower frequency oscillator. It could, as has been explained above, be determined once for every half cycle of the lower frequency oscillator, at any systematic set of intervals, or even at random intervals, provided that the intervals were sufficiently small for the condition as to drift referred to above to be satisfied and that the effect of the control signal applied to the lower frequency oscillator was such as to persist for a sufficiently long interval. However it would also be feasible for the stated determination to be made for each one of an integral number of successive cycles of the lower frequency oscillator, there then being no further phase determination for a period of time, the maximum value of which would be determined by consideration of drift to the persistence of effect of a controlled signal applied to the lower frequency oscillator. Such a mode of operation as this would be particularly useful were the consumption of power is important such as in a watch since the power consumption can be arranged to be substantially less when the oscillators alone are operating than when the frequency comparators are also operative. Obviously such modes of operation may involve some degradation of the overall accuracy of the relationship between the frequency of the two oscillators concerned but again in practical terms it would be possible to arrive at a suitable compromise between the accuracy of the relationship between the two frequencies and such considerations of size, cost, complication and power consumption.

It will be apperciated that in embodiments of the invention in which the lower frequency oscillator of each pair is required to have a period $r$ times that of the first, where $r$ is an integer, the arrangement should preferably be such that the lower frequency oscillator cannot be brought, merely by the control signal produced by the phase comparator, to a condition in which its period is either $(r+1)$ (or any greater integer) or $(r-1)$ (or any lesser integer) times that of the first. Then if the required relationship between the frequency of the two oscillators should be destroyed or lost, e.g. by transient interference or temporary interruption of the power supply, when the phase relationship is again re-established the required frequency relationship will also be re-established without ambiguity.

We claim:

1. A horological instrument comprising a crystal controlled high frequency electrical oscillator, at least one intermediate frequency electrical oscillator, motor means for providing a rotary motion, means for causing the motor means to operate so that said rotary motion has a speed having a fixed relationship to the frequency of the intermediate frequency oscillator, the frequency of the intermediate frequency oscillator being adjustable within limits and stable in the short term, a number of frequency controllers equal to the number of intermediate frequency oscillators, each frequency controller being arranged to maintain the freqency of an intermediate frequency oscillator at a fixed fraction of the frequency of the oscillator having the adjacent and higher frequency, each frequency controller comprising means for generating successive signals at predetermined successive times in accordance with the relative phase of the oscillations of the two oscillators at those times, said signals acting to adjust the lower frequency in the sense to maintain the said relative phase constant, and time indicating means arranged to be driven by the motor means.

2. A horological instrument as claimed in claim 1 wherein the motor means comprise a mechanical oscillator and an indexing mechanism driven by the mechanical oscillator and wherein said means for causing the motor means to operate with a rotary motion having a speed with a fixed relationship to the frequency of the intermediate frequency oscillator is arranged to maintain the frequency of the mechanical oscillator at a fixed fraction of the intermediate frequency oscillator and comprises means for generating successive signals at predetermined successive times in accordance with the relative phase of the two oscillations at those times, said signals acting to adjust the frequency of the mechanical oscillator in the sense to maintain said relative phase constant.

3. A horological instrument as claimed in claim 1 wherein at least one of the frequency controllers comprises means to derive a pulse of defined width less than that of a period of the higher frequency oscillations from at least some oscillations at the lower frequency, and AND gate means having first and second inputs, the oscillations of the higher frequency and the pulses being fed to the first and second inputs respectively so that the output of the AND gate means is a function of the relative phase of the oscillations at the higher and lower frequencies, the output of the gate means acting to alter the frequency of the lower frequency oscillator in the sense to maintain said relative phase constant.

4. A horological instrument as claimed in claim 1 wherein at least one of the frequency controllers includes an integrator for integrating the said successive signals, the integrator having a time constant long in comparison with the period of the lower frequency.

5. A horological instrument as claimed in claim 4 wherein the frequency controller includes a monostable for generating a pulse of a fixed magnitude and a fixed width less than the period of the lower frequency oscillator at a point in each cycle of the oscillations at the lower frequency, the said point being dependent on the amplitude of the output of the integrator, the pulse generated by the monostable being applied to the lower frequency oscillator so as to alter its period in the sense to maintain said relative phase constant.

6. A horological instrument as claimed in claim 5 wherein at least one of the frequency controllers comprises means to derive a pulse of defined width less than that of a period of the higher frequency oscillations from each or selected oscillations at the lower frequency, and AND gate means having first and second inputs, the oscillations of the higher frequency and the pulses being fed to the first and second inputs respectively so that the output of the AND gate means is a function of the relative phase of the oscillations at the higher and lower frequencies, the ouput of the gate means acting to alter the frequency of the lower frequency oscillator in the sense to maintain said relative phase constant and wherein the said means to generate a pulse is arranged to be supplied with the pulses generated by the monostable.

7. A horological instrument as claimed in claim 1 wherein at least one of the frequency controllers is arranged to compare said successive signals with a datum.

8. A horological instrument as claimed in claim 1 wherein at least one of the frequency controllers comprises pulse generating means for generating a pulse at a defined instant in each cycle of the oscillations at the lower frequency, and a bistable to which the said pulses and the oscillations at the higher frequency are fed, the said pulses serving to trigger the bistable from its quiescent state to which it is caused to revert at a defined point in the next cycle of the oscillations at the higher frequency so that the output signal of the bistable is a pulse whose width is dependent on the relative phase of the two oscillations, the output signals of the bistable acting to alter the frequency of the lower frequency oscillator in the sense to maintain said relative phase constant.

9. A horological instrument as claimed in claim 8 wherein the frequency controller includes a ramp generator arranged to produce a linearly changing potential during each output signal of the bistable.

10. A horological instrument as claimed in claim 9 wherein the ramp generator is connected to the pulse generating means which causes, in the intervals between the pulses generated by the pulse generating means, said potential to revert to a datum value.

11. A horological instrument as claimed in claim 2 wherein the mechanical oscillator is an electromechanical oscillator comprising a spring restrained balance arranged to perform rotary oscillations, a magnet assembly, a coil assembly, one of the said assemblies being carried by the balance and the other being fixed so that two E.M.F.'s of opposite polarity are induced in the coil assembly during each swing in each direction of the balance, and an electronic circuit to which the said induced E.M.F.'s are fed and which, in response to at least some of the said E.M.F.'s, applies to the coil assembly a current pulse which interacts with the flux produced by the magnet assembly to produce an impulse on the balance in the sense to maintain its oscillations.

12. A horological instrument as claimed in claim 11 wherein the electronic circuit, in response to each of the said E.M.F.'s, applies to the coil assembly a current pulse, and wherein the frequency controller associated with the electromechanical oscillator generates successive signals in accordance with the relative phase of the said induced E.M.F.'s and the oscillations of the higher frequency, these successive signals being applied to the electronic circuit and acting to alter the relative magnitudes of the current pulses fed to the coil assembly in response to induced E.M.F.'s of opposite polarity in the sense to maintain the said relative phase constant.

13. A horological instrument as claimed in claim 12 wherein the coil assembly comprises a trigger coil in which the said E.M.F.'s are induced and a drive coil to which the said current pulses are applied, the direction of the current in the drive coil being dependent on the polarity of the induced E.M.F. which gave rise to that current pulse, and wherein each of the said successive signals acts by controlling the potential of one end of the drive coil, the current pulses being driven through the drive coil by potential changes of constant magnitude of the other end of the drive coil.

14. A horological instrument as claimed in claim 13 wherein one of the said successive signals is generated on the occurrence of the first E.M.F. induced in the trigger coil in each swing of the balance and acts to alter the said potential of one end of the drive coil which remains constant during both of the drive pulses of that swing.

15. A horological instrument as claimed in claim 14, the frequency controller associated with the electromechanical oscillator being arranged to compare said successive signals with a datum and comprising pulse generating means for generating a pulse at a defined instant in each cycle of the oscillations at the lower frequency, a bistable to which the said pulses and the oscillations at the higher frequency are fed, the said pulses serving to trigger the bistable from its quiescent state to which it is caused to revert at a defined point in the next cycle of the oscillations at the higher frequency so that the output signal of the bistable is a pulse whose width is dependent on the relative phase of the two oscillations, a ramp generator arranged to produce a linearly changing potential during each output signal of the bistable, the output signals of the ramp generator acting to alter the frequency of the lower frequency oscillator in the sense to maintain said relative phase constant, the ramp generator being connected to the pulse generating means which causes, in the intervals between the pulses generated by the pulse generating means, said potential to revert to a datum value and the width of each pulse generated by the pulse generating means being greater than the time interval from the first E.M.F. induced in the trigger coil in each swing of the balance to the end of the second current pulse in the drive coil in that swing.

16. A horological instrument as claimed in claim 15 which comprises an amplifier to which said potential is applied and which provides an implicit datum with which the said potential is compared, the output of the amplifier being connected to the said one end of the drive coil.

17. A horological instrument according to claim 1, in which the controlled high frequency electrical oscillator has a frequency of at least 1 mHz.

18. A horological instrument according to claim 17, including two intermediate frequency electrical oscillators, and in which said fixed fractions are such that division ratios between frequencies of the electrical oscillators are each greater than 400 to 1.

References Cited

UNITED STATES PATENTS 3,248,664 4/1966 Krasnick et al. ---------- 331—2

FOREIGN PATENTS 1,334,088 6/1963 France.

RICHARD B. WILKINSON, Primary Examiner

E. C. SIMMONS, Assistant Examiner

U.S. Cl. X.R.

318—129